US00RE36558E

United States Patent [19]

Moore et al.

[11] E Patent Number: Re. 36,558

[45] Reissued Date of Patent: Feb. 8, 2000

[54] KEYLESS CHUCKING DEVICE

[76] Inventors: Sidney D. Moore, 2173 N. Wilkes Ct., Claremont, Calif. 91711; Kenneth T. Stump, 1845 Wanamaker Dr., Covina, Calif. 91723

[21] Appl. No.: 08/339,901

[22] Filed: Nov. 14, 1994

Related U.S. Patent Documents

Reissue of:

[64] Patent No.: 5,197,749
Issued: Mar. 30, 1993
Appl. No.: 08/853,990
Filed: Mar. 20, 1992

U.S. Applications:

[63] Continuation of application No. 08/153,562, Nov. 16, 1993, abandoned.

[51] Int. Cl.[7] ..... B25B 13/44

[52] U.S. Cl. ..... 279/147; 81/16; 279/902

[58] Field of Search ..... 279/60–65, 134, 279/135, 147, 150, 902; 81/16

[56] References Cited

U.S. PATENT DOCUMENTS

| | | | |
|---|---|---|---|
| D. 277,160 | 1/1985 | Antone | 81/3.4 |
| 2,341,529 | 4/1944 | Cohen | 279/52 |
| 2,575,903 | 1/1951 | Youhouse | 279/52 |
| 2,684,856 | 7/1954 | Stoner | 279/902 |
| 2,716,555 | 8/1955 | Rowe | 279/56 |
| 3,038,187 | 6/1962 | Schumacher | 81/3.41 |
| 3,947,924 | 4/1976 | Fox | 24/3 A |
| 4,095,811 | 6/1978 | Cohen | 279/1 K |
| 4,277,074 | 7/1981 | Kilberis | 81/3.4 |
| 4,317,578 | 3/1982 | Welch | 279/62 |
| 4,323,324 | 4/1982 | Eberhardt | 279/62 |
| 4,389,146 | 6/1983 | Coder | 279/62 |
| 4,395,170 | 7/1983 | Clarey | 279/902 |
| 4,460,296 | 7/1984 | Sivertson | 279/134 |
| 4,498,682 | 2/1985 | Glore | 279/902 |
| 4,575,108 | 3/1986 | Whitehead | 279/59 |
| 4,655,464 | 4/1987 | Manschitz et al. | 279/64 |
| 4,682,918 | 7/1987 | Palm | 279/902 |
| 4,817,971 | 4/1989 | Flynn | 279/1 K |
| 4,844,488 | 7/1989 | Flynn | 81/3.4 |
| 4,915,555 | 4/1990 | Smothers | 279/60 |
| 5,011,343 | 4/1991 | Saban et al. | 279/134 |

FOREIGN PATENT DOCUMENTS

| | | | |
|---|---|---|---|
| 3527234 | 2/1987 | Germany | 279/150 |

*Primary Examiner*—Steven C. Bishop
*Attorney, Agent, or Firm*—Christie, Parker & Hale, LLP

[57] ABSTRACT

A keyless chucking device for use with existing and specially-designed chucks mounted on rotary power tools to cause the chuck's jaws to grip or release auxiliary tools such as drill bits. The device is especially suited for use with variable speed, reversible, electric drills and promotes speed and efficiency in tool chucking operations. In a preferred embodiment, the device may alternatively, at the discretion of the operator, be attached to, or removed from, the chuck of the power tool during its use in operations commonly encountered in the practice of the art.

21 Claims, 4 Drawing Sheets

FIG. 2
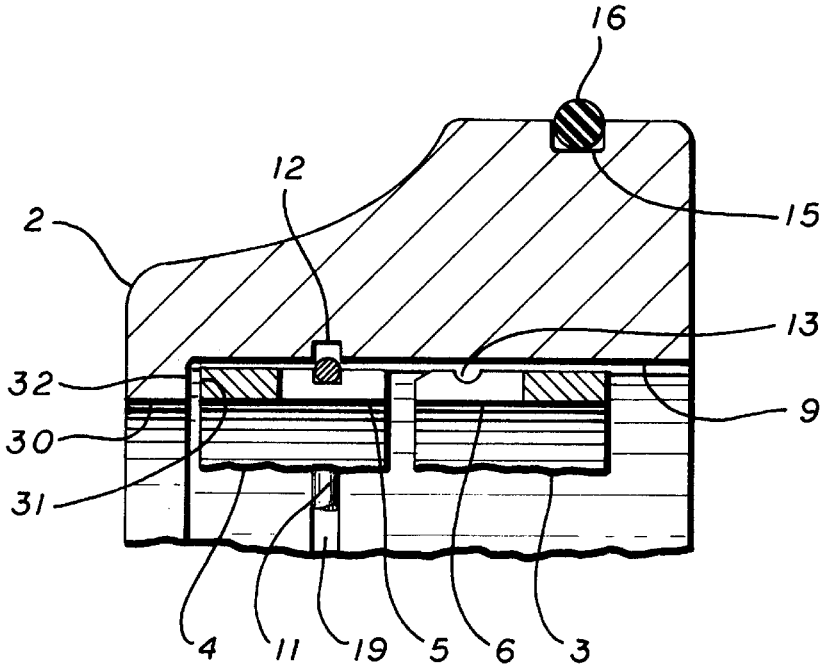
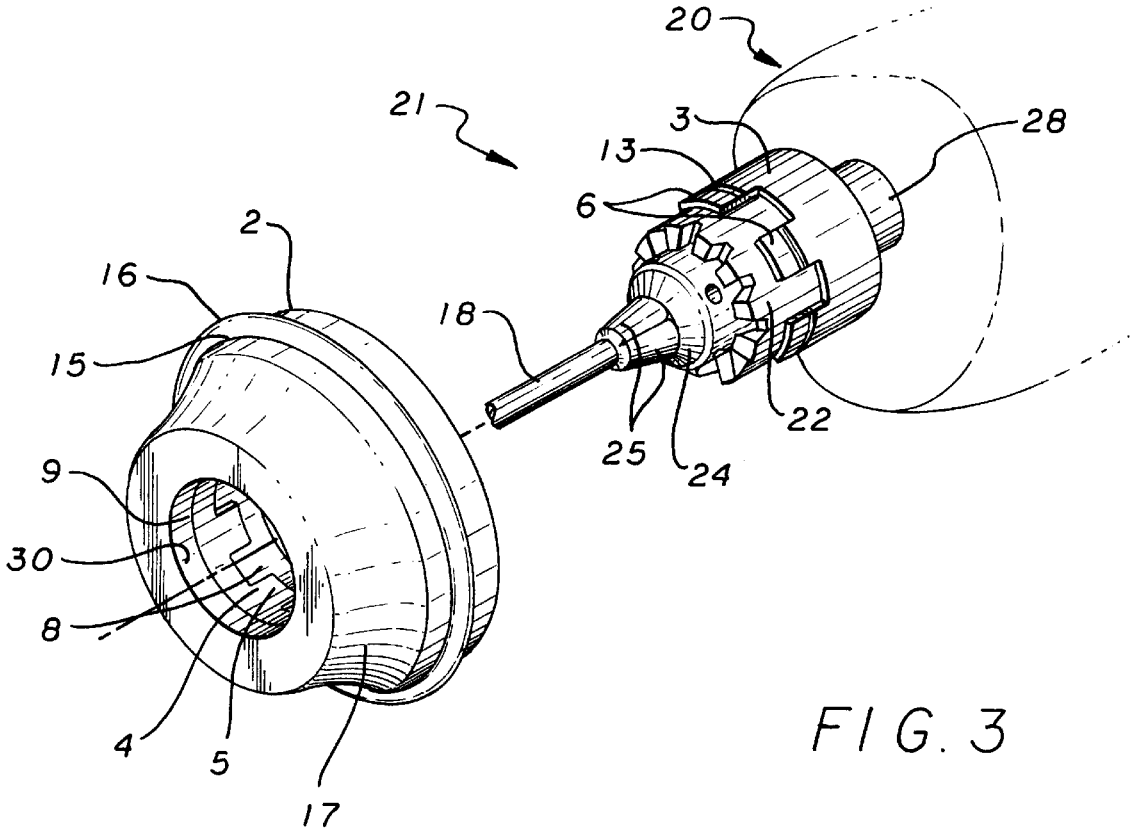
FIG. 3

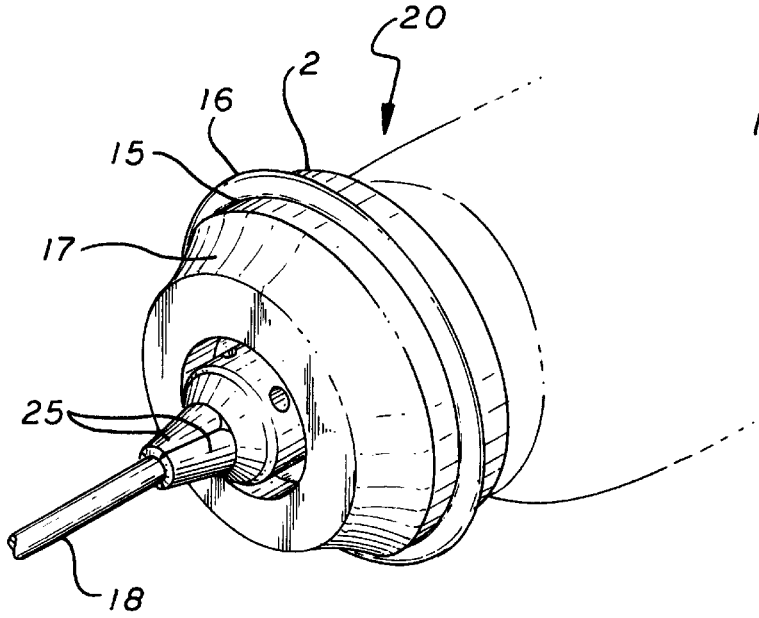
FIG. 4
FIG. 6
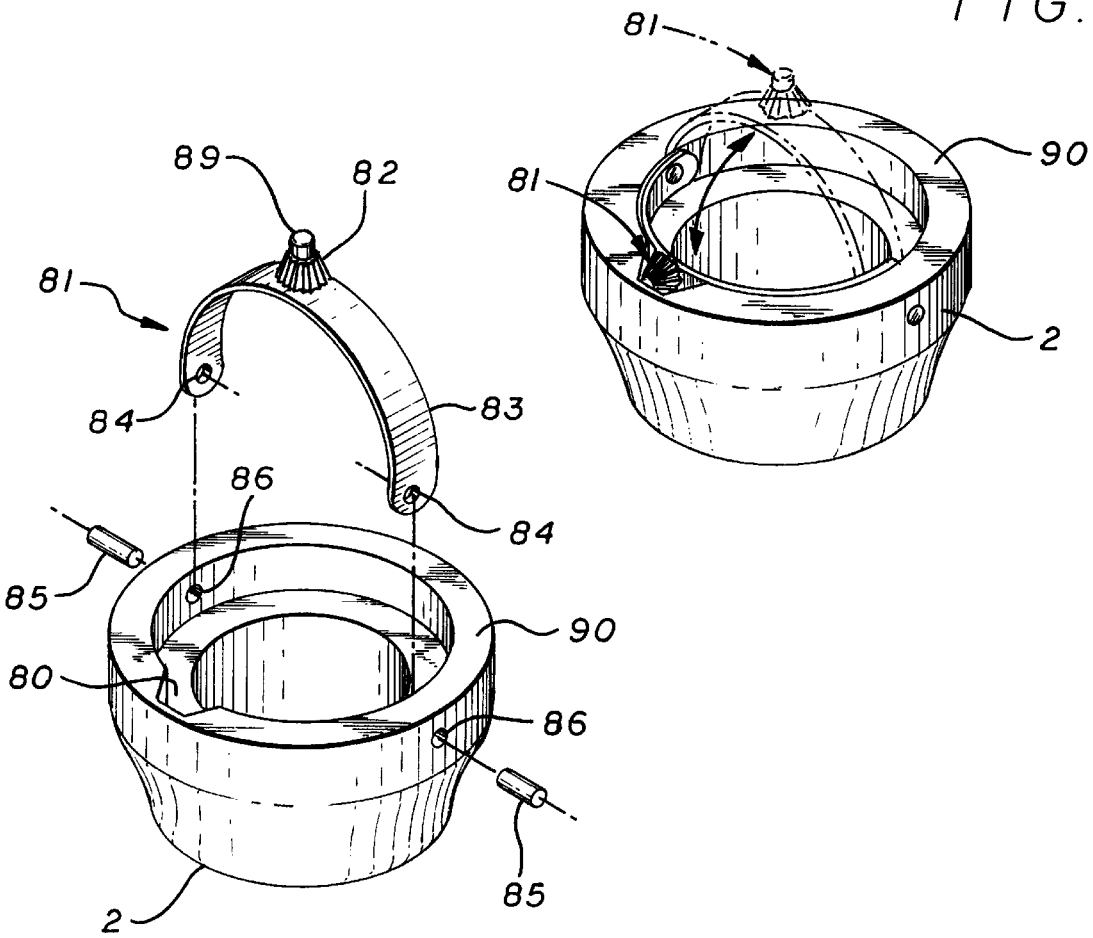
FIG. 5

FIG. 7
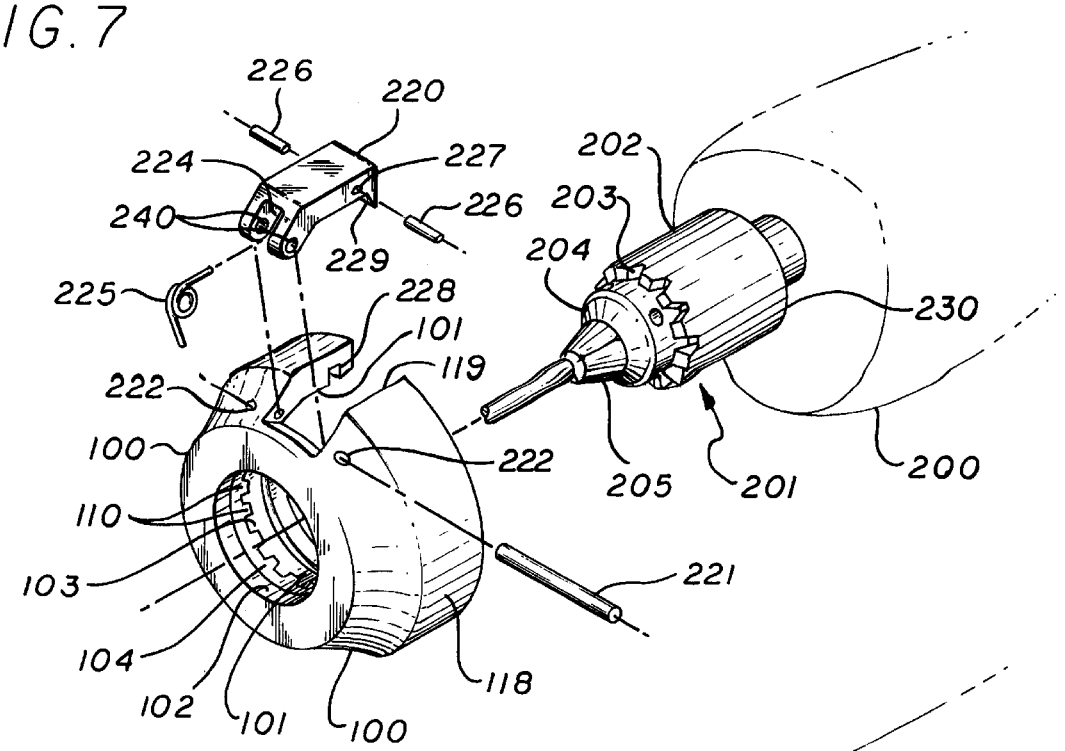
FIG. 8
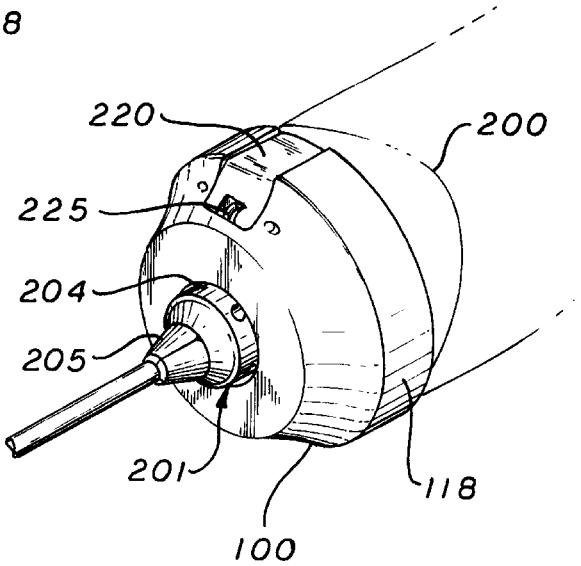
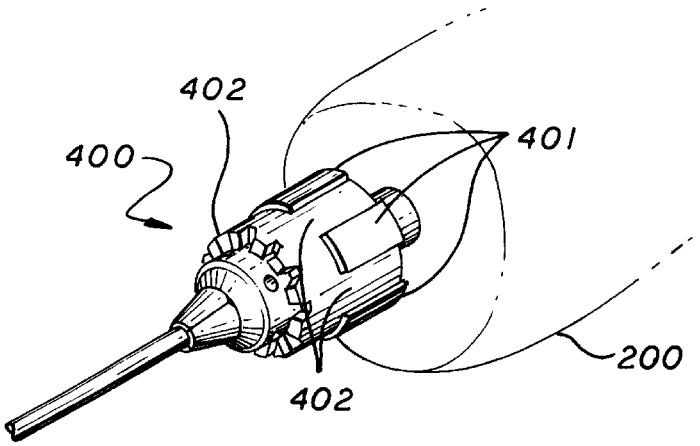
FIG. 9

KEYLESS CHUCKING DEVICE

Matter enclosed in heavy brackets [ ] appears in the original patent but forms no part of this reissue specification; matter printed in italics indicates the additions made by reissue.

*CROSS-REFERENCE TO RELATED APPLICATION*

*This is a continuation of application Ser. No. 08/153,562, filed Nov. 16, 1993, now abandoned.*

BACKGROUND OF THE INVENTION

In accordance with the invention claimed, a new and improved keyless powered chucking device for use with variable speed reversible (VSR) power tools, is provided. The present invention utilizes the rotational force of a power tool's spindle to actuate the jaws of the tool's chuck during the opening and closing of same in tool changing operations. Thus, the invention provides greater convenience, speed and chucking efficiency than is provided by the devices of the prior art. In addition, the present invention may be used interchangeably with more than one power tool.

Furthermore, the simple construction of the present invention eliminates complex, bulky, mechanisms which prevent the associated tool's use in restricted quarters and which are prone to jamming when invaded by the normal by-products of power tool operation. By contrast with the prior art, the present invention is compact, safe, reliable and efficient in operation. The handheld active chucking component of the present invention is in place only during actual chuck-actuating operations. At all other times, the power tool's operation is unencumbered by the present invention. And, again distinguishing over the prior art, the present invention may be put to use on other power tools during the foregoing idle periods.

Recognizing that in certain situations it is either advantageous or necessary to leave devices of the present invention attached to the power tool during certain types of use, a feature of a preferred embodiment of the present invention is a detented retaining element which fixes the device to the chuck of the associated power tool unless overridden in its purpose for removal by an operator. The detented retention of the device to the power tool as provided for by the retaining element also provides a convenient means of storing the device during periods of non-use.

These, and additional, advantages of the invention will become apparent as the following description proceeds and the features of novelty which characterize the invention are pointed out with particularity in the claims appended to and forming a part of this specification.

SUMMARY OF THE INVENTION

We have invented an attachment for the chuck of a hand power tool having an apertured body with an exterior hand grip surface and an interior dogged surface which selectively engages mating dogs on the cylindrical surface of the chuck. A snap ring holds the attachment on the chuck. Rearward movement of the attachment causes the dogs to engage. Operation of the power tool opens or closes the chuck depending upon the direction of movement to seat or release a tool such as a drill bit in the chuck.

In alternate embodiments a lever type locking device is used to retain the attachment during drill change operations.

DESCRIPTION OF THE DRAWING

This invention may be more clearly understood from the following detailed description and by reference to the drawing in which:

FIG. 2 is a fragmentary cross sectional view of the invention showing the relationships of the various elements;

FIG. 3 is an assembled perspective view of the components shown in FIG. 1;

FIG. 4 is a perspective view of the elements shown in FIG. 3 installed upon a chuck of a VSR power tool to effect chucking operations;

FIG. 5 is an exploded perspective view of an alternate embodiment of the present invention featuring an auxiliary manual chuck key;

FIG. 6 is a perspective view of the components of FIG. 5 assembled and with the manual chuck key nested in its stored position and a phantom view of the manual chuck key raised into position for use;

FIG. 7 is a perspective view of a second alternate embodiment of the present invention wherein the function of the engagement dogs of preceding embodiments is fulfilled by auxiliary teeth in the device which engage existing teeth on the chuck;

FIG. 8 is an assembled perspective view of the elements shown in FIG. 7; and FIG. 9 is a perspective view of a drill chuck specially adapted in manufacture for use with the present invention.

DESCRIPTION OF THE PREFERRED EMBODIMENTS

Figure 1:
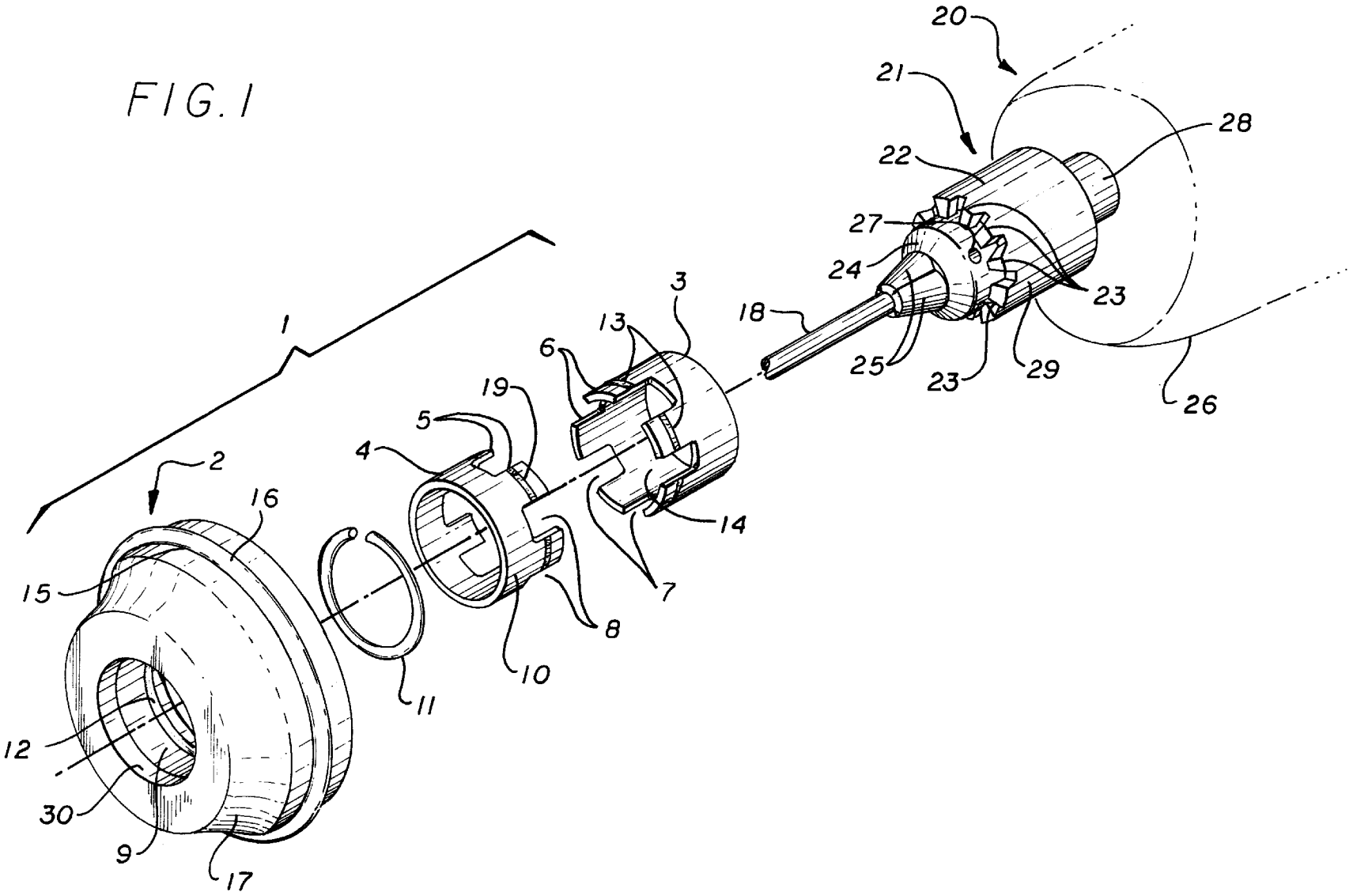
FIG. 1 is a partial perspective view of a hand-held VSR power tool with geared chuck and an exploded view of an embodiment of the present invention in position for introduction upon the chuck for use in subsequent chucking operations.

Referring more particularly to the drawings by characters of reference, FIG. 1 discloses a conventional VSR power tool 20 employing geared chuck 21. Chuck 21 comprises a jaw-carrying member 24 having one or more holes 27 radially arranged in its outer periphery to permit the use of a traditional chuck key (not shown) to actuate the chuck for changing replaceable auxiliary tools such as drill bit 18. Carried within member 24 are jaws 25 for securing tools and bits within chuck 21. Chuck 21 is further provided with outer cylindrical sleeve 22 which is mounted to turn, selectively, on the axis of drive spindle 28 of power tool 20 for the purpose of opening and closing jaws 25 to secure or release replaceable tool 18 being carried thereby.

A rack of teeth 23 is arranged around the periphery of the forward end of cylindrical sleeve 22 for engagement with the corresponding teeth of a traditional chuck key. Subsequent rotation of the chuck key by an operator causes sleeve 22 to rotate on the axis of spindle 28. Depending upon the direction of rotation induced by the operator, the rotation of sleeve 22 acts to either open, or close, jaws 25 for chucking operations.

It is readily apparent that actuation of jaws 25 is caused by the rotation of jaw-carrying member 24 relative to outer cylindrical sleeve 22. It is equally apparent that it is immaterial which of these parts, member 24 or sleeve 22, is the active rotational component. In the case of traditional chuck keys, it is sleeve 22 which is made to turn to effect chucking operations. In the present invention the opposite occurs. As will be described below, in the present invention, rotation of member 24 is induced by the motive power of VSR power tool 20, to which it is fixedly attached by means of spindle 28, while sleeve 22 is held against rotation by means of the present invention.

A distinct advantage of the present invention over traditional chuck keys is that in the present invention chucking force is applied axially while a chuck key must be moved from one hole 27 to another, sequentially, around the chuck to properly tighten the jaws. This is because the sideways force applied by the chuck key causes the chuck's cylinders to bind before the chucking operation is satisfactorily accomplished.

Shown in FIG. 1 in exploded view, and in FIG. 2 in cross section, is chucking device 1 of the present invention comprising a selectably removable body 2 which carries dogged ring 4 in bore 9, detent spring 11 in slot 12, and gripper o-ring 16 in groove 15. Also shown is dogged ring 3 provided for fixed attachment to outer cylindrical sleeve 22 of chuck 21. First dogs 5 of ring 4 are sized to fit into intervals 7 between second dogs 6 of ring 3 when body 2 is installed on chuck 21. Dogs 6 of ring 3 are similarly configured to fit into intervals 8, spaced between dogs 5 of ring 4. Thus installed, outer cylinder 22 of chuck 21 may be held against rotation when an operator grasps body 2 and gripper o-ring 16 and applies motive power to power tool 20 to cause spindle 28 and, by their interconnection, inner jaw-carrying cylinder 24 to rotate. This condition causes jaws 25 to open or close depending upon the direction of rotation induced by the motive power of power tool 20. Thus, chuck 21 is caused to grip or release an auxiliary tool, such as a drill bit, carried thereby.

Body 2 has first axial bore 9 and second axial bore 30. First and second axial bores sections 9 and 30 define a stepped bore through body 2 and, further, define therebetween radial step 31.

First bore 9 fixedly receives ring 4 positioned such that end surface 32 of ring 4 bears against step 31 of body 2.

Formed on the opposite end of ring 4 are first engagement dogs 5 separated by first intervals 8. First engagement dogs 5 of ring 4 have first annular groove segments 19 let into their outer surfaces to receive detent spring 11. Ring 3 carries second engagement dogs 6 separated by second intervals 7 for selectable interdigital engagement of dogs 5 with dogs 6 of rings 4 and 3, respectively, as previously described. In addition, second dogs 6 of ring 3 have second annular groove segments 13 let into their outer surfaces to correspond with first annular groove segments 19 of ring 4 to selectably receive detent spring 11 when the assembled combination of body 2, ring 4, and detent spring 11 is positioned upon ring 3 when ring 3 is fixedly attached upon chuck 21 of power tool 20. The annular groove segments 13 provide detented retention of body 2 on ring 3 for temporary retainment thereon once the respective dogs 5 and 6, of rings 3 and 4, respectively, are mutually engaged by the sliding of body 2 over ring 3 by an operator and first groove segments 13 are aligned with similar second groove segments 19 in the outside surface of each of second dogs 5 of ring 4. The geometry of the various grooves and detent spring is such that body 2 is retained in engagement upon the chuck of power tool 20 while readily removable by an operator when desired.

Body 2 further carries annular groove 12 let into first axial bore 9 to allow space for detent spring 11 to flex upon insertion of ring 3 into bore 9. Annular groove 12 is aligned with second groove segments 19 of ring 4 to form a space therebetween for movably capturing detent spring 11.

The above described relationships are clearly shown in cross section in FIG. 2.

Also shown in FIG. 2, body 2 further comprises annular o-ring groove 15 to receive resilient gripper o-ring 16. Gripper o-ring 16 serves to provide a more comfortable and secure grip when held in the hand of an operator. In addition, body 2 comprises annular concave radiused portion 17 formed to provide an improved form and surface for gripping in the hand of an operator while gripping or releasing an auxiliary tool such as a drill bit in the jaws 25 of chuck 20.

Referring now to FIG. 3, ring 3 is shown fixedly attached on outer cylindrical sleeve 22 of chuck 21 and ring 4 is fixedly inserted into bore 9 of body 2 of the present invention. Rings 3 and 4 may be retained by any of a variety of means. A practical method of retention is that of applying in adhesive between bore 14 of ring 3 and outer surface 29 of chuck cylinder 22. Other means for mounting will be obvious to one skilled in the art. And, for example, in a dedicated chuck embodiment, add-on ring 3 may be eliminated and dogs 6 and intervals 7 formed in the peripheral surface of outer cylindrical sleeve 22 of chuck 21 by the same, or similar, process commonly used to form the rack of teeth typical of the prior art.

FIG. 4 illustrates body 2 installed upon chuck 21. In this condition, detent spring 11 of FIGS. 1 and 2 engages groove segments 13 to assure retention of body 2 on chuck 21. When body 2 is installed in this manner, engagement of dogs 5 with dogs 6 is provided. The result is that outer cylindrical sleeve 22 of chuck 21 is rotatably locked to body 2. Auxiliary tool, i.e., drill operations may occur in this condition. In this case, body 2 rotates with chuck 21 of power tool 20. This allows an operator to conveniently leave the apparatus mounted on chuck 21 while performing routine operations which require frequent tool changes and where quarters are not constricted.

When a change in the drill tool is desired, an operator switches power tool 20 from "forward" to "reverse", grasps body 2 to hold it against rotation along with outer cylindrical sleeve 22 due to the interconnection of dogs 5 with dogs 6, and selectively applies power to the tool. Because the operator's grasp prevents rotation of outer cylindrical sleeve 22, the torque of the power tool is transmitted to jaw-carrying member 24 of chuck 21 to overcome the chucking force of jaws 25 upon replaceable tool 18 being held thereby and the tool 18 is released.

Once loosened, replaceable tool 18 is removed and replaced with the next desired tool. The power tool is switched from "revere" to "forward" and body 2 is once again held against rotation while power is supplied to power tool 20 to cause jaws 25 to close on, and securely hold, the new drill tool.

FIG. 5 is an exploded view the apparatus of FIGS. 1–3 showing additional structure which provides a built-in chuck key assembly 81 for convenience in performing manual chucking operations if desired (in the event of power failure, or the like). Geared frustocone portion 82 of assembly 81 has pin 90 axially extending therefrom for inserting into one of holes 27 of power tool 20 (FIG. 1) to provide a pivot point for turning as is well known in the art of chuck key design and operation. Frustoconical portion 82 is fixedly attached at the center of arcuate band 83. Arcuate band 83 has holes 84 for passage therethrough of retaining pins 85. Pins 85 anchor in receiving holes 86 in body 2 to retain chuck key assembly 81 in pivotable engagement with body 2. Recess 80 is provided in body 2 to receive chuck key assembly 81 when the latter is pivoted on pins 85 into recess 80 for storage. As can be better understood and appreciated by reference to FIG. 6, chuck key assembly 81 lies flush with back surface 90 of body 2 when in the stored position. While the tool is operated, centrifugal force aids in mainstorm the assembly 81 in its stored position.

In operation, chuck key assembly 81 is pivoted by an operator to a position perpendicular to back surface 90 of body 2 as shown in phantom lines in FIG. 6. In this position, body 2 serves as a handle for use in applying torque to chuck key assembly 81 during manual chucking operations. In manual operation, the present invention is superior to conventional chuck keys in its ergonomic design. The chance of slippage and subsequent injury to the operator, so common with the awkward devices of the prior art, is totally overcome.

FIG. 7 illustrates a second alternative embodiment of the present invention. In the chucking device shown in FIG. 7, essentially cylindrical body 100 has major axial bore 101 extending for a substantial portion of the length of body 100 and minor axial bore 102 extending the remaining length of its length. The difference in the diameters of bores 101 and 102 forms a step 103 therebetween. Fixed with respect to step 103 is toothed ring 104. Toothed ring 104 may be integral to body 100 or it may be a separate ring fixedly inserted into major bore 101 against step 103.

In either case, teeth 110 of toothed ring 104 are sized and positioned for mating engagement with annular toothed rack 203 of chuck 201. Bores 101 and 102 are sized to slidably receive outer cylindrical sleeve 202 and jaw-carrying member 204, of chuck 201, respectively. The relationship of these various elements is such that, when body 100 is brought over chuck 201 by an operator and pressed axially toward power tool 200 to effect mating engagement therewith, teeth 110 matingly engage toothed rack 203. In this condition, an operator may grasp body 100, preventing rotation thereof, and, through mating engagement of teeth 110 with toothed rack 203 of outer cylindrical sleeve 202 of chuck 201, effect chucking action when the motive power of VSR power tool 200 is activated to cause rotation of spindle 206 and jaw-carrying member 204, which rotation, because outer cylindrical sleeve 202 is being held by the operator against rotation, causes jaws 205 to open, or close, depending upon the direction in which the motive power to power tool 200 is being biased.

Also shown in FIG. 7 and FIG. 8 is latch receiving slot 119 forming an axial opening in the side wall 118 of body 100. Slot 119 is sized to receive latch lever 220 which is retained therein in spring-biased pivotable fashion by retaining pin 221. Pin 221 passes through holes 222 of body 100 and holes 240 of latch lever 220. Pin 221 further passes through the coils of biasing spring 225 for retainment thereby in recess 224 of lever 220. Biasing spring 225 biases lever 220 outward of the axis of body 100. Movement restricting pins 226 are retained within receiving holes 227 in a manner which allows their extension outward of the sides of lever 220. The extended portions of pins 226 engage recesses 228 on bore 101 to limit the degree of travel of lever 220 induced by the bias of spring 225 to just permit clearance between the leading edge of flange 229, formed on lever 220, and outer cylindrical sleeve 202 of chuck 201.

Once body 100 is fully engaged upon chuck 201, an operator presses lever 220 axially inward, against the bias of spring 225. This causes flange 229 to pass behind rear skin 230 of cylindrical sleeve 202 thereby entrapping sleeve 202. Maintaining this condition results in positive retention of the present device upon the chuck of the power tool. This eliminates the need for constant rearward pressure being exerted by an operator to prevent the teeth of the invention and those of the chuck from camming out of engagement during high torque periods due to the tapered shape of the teeth. It is to be noted that these elements are not required in the preferred embodiment previously discussed with reference to FIGS. 1–4 since the engagement of first dogs 5 with second dogs 6 provides positive engagement with no camming tendency whatsoever, regardless of the intensity of the torque forces induced by the power tool motor.

Finally, with reference to FIG. 9, a perspective view of a specially manufactured power tool chuck 400 is shown mounted upon a VSR power tool 200 for use with previously shown embodiments during chucking operations. Chuck 400 has angularly displaced discontinuities in the form of drive dogs 401 separated by lands 402 for engaging mating dogs of a chucking device similar to that of FIG. 3.

While detailed descriptions of preferred and alternate embodiments have been provided, it is to be understood that other embodiments of the present invention may comprise elements other than those described while remaining within the spirit of the invention and producing the same results as the described embodiments. For example, with respect to the structure disclosed in FIG. 1, ring 3 may be eliminated and the engaging dogs 5 of ring 4 formed of the same material as, and integral to, body 2. And detent spring 11 may be eliminated entirely, or be in the form of a ball and spring detent, or of any other detenting structure applicable to the disclosed invention. And, as has been previously stated, ring 3 may be replaced with engaging means integral to cylinder 22 of chuck 21 in chucks designed in manufacture to incorporate the present invention.

The above described embodiments of the present invention are merely descriptive of its principles and are not to be considered limiting. The scope of the present invention instead shall be determined from the scope of the following claims including their equivalents.

I claim:

1. [A selectively removable apparatus for use with a gear tightening chuck of rotary power tool including jaws and outer sleeve to assist said chuck in gripping and releasing auxiliary tools selectably carried in the jaws of said chuck whenever the chuck includes jaws and an outer sleeve rotatable to open and close the jaw,] *A selectively removable apparatus for use with a chuck of a rotary power tool, including jaws, a gear portion, and an outer sleeve rotatable to open and close said jaws, and thereby gripping and releasing auxiliary tools selectably carried by said jaws,* comprising:

a body including an outer grippable surface;

an opening defined in said body sized for slidably receiving the outer sleeve portion of said chuck whereby said body covers at least the gear portion of the chuck; and dog means on said body and within said opening and extending rearward toward said outer sleeve for engaging the outer sleeve of the chuck to cause rotational dependence between the outer sleeve and said body of said apparatus to prevent rotation of the outer cylindrical sleeve when said apparatus is held in engagement upon the chuck by an operator and power is applied to the power tool to cause rotation of the remaining portions of the chuck whereby actuation of its jaws is effected to grip or release said auxiliary tools carried thereby, depending upon the direction of rotation of the chuck.

2. [A selectively removable apparatus for use with the chuck of a rotary power tool including jaws and an outer sleeve to assist said chuck in gripping and releasing auxiliary tools selectably carried in the jaws of said chuck whenever the chuck includes jaws and an outer sleeve rotatable to open and close the jaw,] *A selectively removable apparatus for use with a chuck of a rotary power tool,*

*including jaws and an outer sleeve rotatable to open and close said jaws, and thereby gripping and releasing auxiliary tools selectably carried by said jaws,* comprising:

a body;

a first bore defined in said body for receiving therein said outer sleeve of the chuck, said bore extending for a substantial length of said body to allow said body to pass over said outer sleeve to install or remove said body from the chuck;

a second bore defined in said body on the axis of said first bore and communicating with said first bore and extending for the remaining length of said body for receiving a jaw-carrying member of the chuck, said first and second bores defining a bore extending through said body and shaped to conform with the geometry of the chuck for slidably receiving the chuck within said stepped bore;

a step on said body between said first and second bores; and means on said step for engaging said outer sleeve of the chuck to effect rotational dependence between the outer sleeve and said body to prevent rotation of the outer sleeve when said apparatus is held in engagement by an operator upon the chuck and power is applied to said power tool to cause rotation of the remaining portions of the chuck whereby actuation of the jaws is effected to grip or release said auxiliary tools carried thereby depending upon the direction of rotation of the chuck.

3. The apparatus of claim 1 wherein said engaging means defined within said bore are dogs fixedly defined therein, and wherein second dog means is fixedly secured to said outer sleeve of the chuck for mating engagement with said fixedly secured dogs in said bore to effect positive rotational dependence between said apparatus and said outer sleeve.

4. The apparatus of claim 3 wherein said second dog means is secured in a ring which is separate from said outer sleeve of the chuck, said ring being sized for fixed attachment to said outer sleeve whereby said ring and said outer sleeve are caused to be rotationally codependent.

5. The apparatus of claim 2 wherein said engaging means secured on said step is tooth shaped for mating engagement with a predefined rack of teeth on an end of said outer sleeve normally intended for receiving a common chuck key for chuck-actuating operations.

6. The apparatus of claim 1, further comprising an aperture in said body, and manual means for performing chucking operations nested in said aperture and accessibly retrievable by an operator.

7. The apparatus of claim 6 wherein said manual means is pivotably retained in said aperture by pin means mounted on said body.

8. The apparatus of claim 1, and further comprising resilient means fixed to said apparatus to selectably retain said apparatus upon the chuck at the discretion of an operator for convenience in the operation of said power tool and during periods of storage.

9. The apparatus of claim 8 wherein said means to selectably retain said apparatus upon the chuck comprises spring means defined in said bore, and detent means defined on the outer sleeve of the chuck to receive said spring means for selectably securing said apparatus to the chuck.

10. The apparatus of claim 5, further comprising latch means for securing said apparatus to the chuck to assure positive engagement of said apparatus to the chuck during chucking operations to assure constant engagement of said tooth defined on said step with said predefined rack of teeth on said outer sleeve.

11. The apparatus of claim 10 in which said latch means comprises a latch lever pivotably attached at an end to said apparatus, said latch lever having a flange extending from its opposite end for engagement with a portion of said outer sleeve to effect positive capturing of the chuck by said apparatus during chuck-actuating operations.

*12. A selectively removable apparatus for use with a chuck of a rotary power tool, including jaws, a gear portion, and an outer sleeve rotatable to open and close said jaws, and thereby gripping and releasing auxiliary tools selectably carried by said jaws, comprising:*

*a body including an outer grippable surface;*

*an opening defined in said body sized for slidably receiving the outer sleeve portion of said chuck whereby said body covers at least the gear portion of the chuck; and*

*dog means on said body and within said opening and extending toward said outer sleeve for releasably engaging the outer sleeve of the chuck to cause rotational dependence between the outer sleeve and said body of said apparatus to prevent rotation of the cylindrical outer sleeve when said apparatus is held in engagement upon the chuck by an operator and power is applied to the power tool to cause rotation of the remaining portions of the chuck whereby actuation of its jaws is effected to grip or release said auxiliary tools carried thereby, depending upon the direction of rotation of the chuck.*

*13. The apparatus of claim 12 wherein said dog means comprise spaced apart dogs affixed in said opening, and wherein second dog means are fixedly secured to said outer sleeve of the chuck for mating engagement with the dogs in said opening to effect positive rotational dependence between said body and said outer sleeve.*

*14. The apparatus of claim 13 wherein said second dog means are secured in a ring which is separate from said outer sleeve of the chuck, said ring being sized for fixed attachment to said outer sleeve whereby said ring and said outer sleeve are caused to be rotationally codependent.*

*15. The apparatus of claim 13 wherein said second dog means are integrally formed on the outer sleeve of the chuck.*

*16. The apparatus of claim 12, and further comprising spring means in said opening to selectably retain said body upon the outer sleeve of the chuck.*

*17. The apparatus of claim 13, and further comprising spring means in said opening to selectably retain said body upon the outer sleeve of the chuck, and detent means on the second dog means for releasably engaging said spring means to retain the body on the outer sleeve.*

*18. A selectively removable apparatus for use with a chuck of a rotary power tool, including jaws and an outer sleeve rotatable to open and close said jaws, and thereby gripping and releasing auxiliary tools selectably carried by said jaws, comprising:*

*a body including an outer grippable surface;*

*an opening defined in said body sized for slidably receiving therein the outer sleeve of said chuck, said opening extending for a substantial length of said body to allow the body to pass over said outer sleeve to install or remove said body on or from the chuck; and*

*dog means on said body and within said opening comprising spaced apart projections for engaging cooperating surface projections on the outer sleeve in an interdigitated connection engagable and releasable*

*with relative axial movement between the body and the outer sleeve of the chuck to cause rotational dependence between the outer sleeve and said body of said apparatus to prevent rotation of the outer sleeve when said apparatus is held in engagement upon the chuck by an operator and power is applied to the power tool to cause rotation of the remaining portions of the chuck whereby actuation of its jaws is effected to grip or release said auxiliary tools carried thereby, depending upon the direction of rotation of the chuck.*

*19. The apparatus of claim 18 wherein said engaging means defined within said opening are dogs fixedly defined therein, and wherein second dog means is fixedly secured to said outer sleeve of the chuck for mating engagement with said fixedly secured dogs in said opening to effect positive rotational dependence between said apparatus and said outer sleeve.*

*20. A selectively removable apparatus for use with a chuck of a rotary power tool, including jaws, a gear portion, and an outer sleeve rotatable to open and close said jaws, and thereby gripping and releasing auxiliary tools selectable carried by said jaws, comprising:*

*a body including an outer grippable surface;*

*an opening defined in said body sized for slidably receiving the outer sleeve portion of said chuck whereby said body covers at least the gear portion of the chuck; and*

*dog means on said body and within said opening and extending toward said outer sleeve for releasably engaging cooperating second dog means integrally formed on said outer sleeve of the chuck to cause rotational dependence between the outer sleeve and said body of said apparatus to prevent rotation of the outer cylindrical sleeve when said apparatus is held in engagement upon the chuck by an operator and power is applied to the power tool to cause rotation of the remaining portions of the chuck whereby actuation of its jaws is effected to grip or release said auxiliary tools carried thereby, depending upon the direction of rotation of the chuck.*

*21. The apparatus according to claim 20 in which the dog means on the body and the second dog means on the outer sleeve are engaged in an interdigitated connection engagable and releasable with relative axial movement between the body and the outer sleeve.*

* * * * *